(12) United States Patent
Montes Cuen et al.

(10) Patent No.: US 11,724,950 B2
(45) Date of Patent: Aug. 15, 2023

(54) SYSTEM FOR INDUSTRIAL AND HYDROCARBON WASTEWATER TREATMENT

(71) Applicants: Arnulfo Montes Cuen, Jiutepec (MX); Nydia Nohemi Montes Ruelas, Cuernavaca (MX)

(72) Inventors: Arnulfo Montes Cuen, Jiutepec (MX); Nydia Nohemi Montes Ruelas, Cuernavaca (MX)

( * ) Notice: Subject to any disclaimer, the term of this patent is extended or adjusted under 35 U.S.C. 154(b) by 61 days.

(21) Appl. No.: 17/083,820

(22) Filed: Oct. 29, 2020

(65) Prior Publication Data

US 2022/0106212 A1   Apr. 7, 2022

Related U.S. Application Data

(60) Provisional application No. 63/087,596, filed on Oct. 5, 2020.

(51) Int. Cl.
| | |
|---|---|
| *C02F 9/00* | (2023.01) |
| *B01D 17/02* | (2006.01) |
| *B01D 21/01* | (2006.01) |
| *B01D 21/26* | (2006.01) |
| *B01D 5/00* | (2006.01) |
| *C02F 1/00* | (2023.01) |

(Continued)

(52) U.S. Cl.
CPC ............... *C02F 9/00* (2013.01); *B01D 5/006* (2013.01); *B01D 17/0205* (2013.01); *B01D 21/01* (2013.01); *B01D 21/267* (2013.01); *C02F 1/001* (2013.01); *C02F 1/006* (2013.01); *C02F 1/008* (2013.01); *C02F 1/048* (2013.01); *C02F 1/385* (2013.01); *C02F 1/40* (2013.01); *C02F 1/46104* (2013.01); *C02F 1/5236* (2013.01); *C02F 1/66* (2013.01); *C02F 1/68* (2013.01); *C02F 1/76* (2013.01); *C02F 11/006* (2013.01); *C02F 11/16* (2013.01); *C02F 2101/10* (2013.01); *C02F 2101/32* (2013.01); *C02F 2201/005* (2013.01); *C02F 2209/44* (2013.01)

(58) Field of Classification Search
CPC ........................................................ C02F 9/00
See application file for complete search history.

(56) References Cited

U.S. PATENT DOCUMENTS

| | | | |
|---|---|---|---|
| 2004/0188356 A1* | 9/2004 | Haydock | ................ C02F 1/006 210/702 |
| 2006/0186056 A1* | 8/2006 | Ivan | ........................ B03D 1/02 210/221.2 |

(Continued)

FOREIGN PATENT DOCUMENTS

| | | | | |
|---|---|---|---|---|
| CA | 2849290 A1 * | 3/2013 | ........... | B01D 61/002 |
| DE | 4222031 A1 * | 1/1994 | .......... | C02F 1/46104 |
| WO | WO-2013007847 A1 * | 1/2013 | .............. | C02F 1/463 |

*Primary Examiner* — Peter Keyworth
(74) *Attorney, Agent, or Firm* — Defillo & Associates, Inc.; Evelyn A. Defillo

(57) ABSTRACT

An industrial wastewater and hydrocarbon treatment system including of a plurality of reactors and treatment modules that allows the application of principles of chemistry and quantum physics, dissociating electrons from the atoms or chemical elements contained in the hydrocarbon contaminated water. This invention advantageously allows the separation of water and oil in an efficient way, through the use of electromagnetic pulses with low amperage, and a series of filters.

15 Claims, 15 Drawing Sheets

(51) Int. Cl.

| | |
|---|---|
| C02F 1/40 | (2023.01) |
| C02F 1/461 | (2023.01) |
| C02F 1/52 | (2023.01) |
| C02F 1/38 | (2023.01) |
| C02F 1/66 | (2023.01) |
| C02F 1/04 | (2023.01) |
| C02F 1/68 | (2023.01) |
| C02F 11/00 | (2006.01) |
| C02F 11/16 | (2006.01) |
| C02F 101/32 | (2006.01) |
| C02F 101/10 | (2006.01) |
| C02F 1/76 | (2023.01) |

(56) References Cited

U.S. PATENT DOCUMENTS

2009/0205973 A1* 8/2009 Monzyk .................. C25B 15/00
 204/276
2009/0255874 A1* 10/2009 Tenne .................. B01D 61/025
 210/96.1
2010/0274068 A1* 10/2010 Chung .................... C02F 1/722
 210/759

* cited by examiner

SYSTEM FOR INDUSTRIAL AND HYDROCARBON WASTEWATER TREATMENT

CROSS REFERENCE TO RELATED APPLICATION

This application claims the benefit of priority to U.S. Provisional Application No. 63/087,596 filed Oct. 5, 2020, the contents of which are incorporated herein by reference.

TECHNICAL FIELD

The present invention belongs to the technical field of wastewater or sludge treatment and more specifically the present invention refers to a system for the treatment of industrial wastewater and hydrocarbons.

BACKGROUND OF THE INVENTION

A plurality of devices containing a plurality of components for the treatment of congenital water are known in the state of the art, involved in a plurality of processes that make them different from each other and providing similar technical characteristics, using components that vary depending on the treatment to be applied; for example an application is known which refers to a water treatment device for excellently controlling the residual chlorine concentration in the water to be treated by a water treatment device for controlling the residual chlorine concentration in the water to be treated using a residual chlorine sensor. A control means is provided for controlling an electrical quantity in the device so that a necessary quantity of free residual chlorine is generated based on a value measured by the residual chlorine sensor. Due to the correlation of a volume of free residual chlorine that is generated by electrolysis with an amount of applied electrical current, the control of the residual chlorine concentration is excellently performed when the electrolysis generates a quantity of chlorine relative to a quantity poor residual chlorine.

Likewise, a series of inventions are known that have a large number of electrodes, each composed of a carbon rod supplying a direct current, are arranged on the upstream side of the treated water flood plate of the sedimentation tank. end of the sewage treatment facility and a foam skimmer is arranged between the electrodes and the overflow plate and a buffer plate and the chemical solution. the spraying means is arranged on the upstream side of the electrodes.

There is also knowledge of a series of flotation devices of the type in which a liquid to be treated, such as activated sludge, is made to flow through a tank and is subjected to treatment by gas bubbles generated by electrolytic action, for example so that suspended materials, generally but not necessarily solid, in the liquid are brought to the surface of the tank by said bubbles to form a layer of thickened material, and which include means for removing the thickened material from the surface of the liquid contained within the tank, characterized in that the liquid to be treated is introduced into the tank by flow through at least one elongated tube of conductive material that defines a cathode with respect to an anode mounted within said tube and that extends substantially along it.

Also, the state of the art provides apparatus for treating salt water, the method of which is to run feed water through a skimmer unit to form oil-free water. Oil-free water passes through an electrocoagulation unit to form electro-coagulated water. A precipitating agent is added to the electro-coagulated water and stirred to form a water/floc mixture. A polymeric coagulation enhancing agent is added to the water/floc mixture with gentle agitation and the coagulants in the mixture are allowed to settle. Partially clarified water is drawn from the mixture from a level above the settled coagulants. The partially clarified water is passed through at least one settler and the coagulants are removed from the bottom of the at least one settler. A stream of clarified salt water is drawn from the final decanter. The necessary equipment can be mounted on a trailer. The trailer may be provided with a ladder and a gangway to facilitate safe inspection.

Finally, there are scalable compact modular systems for water treatment, where various water treatment components with a scalable primary electrocoagulation treatment component and solids settling and setting component can be integrated and enclosed in a scalable module to reduce the total module space and allow easier installation without significant time and cost. It includes a treatment component in combination with a coagulation and flocculation treatment component so that contaminants can coagulate and flocculate prior to the separation process of coagulants and flocculants.

Floating solids can be removed from the separating component by a sludge skimmer or device with a similar function and floating solids can be removed from the separating component by a rake or a mud pump.

The disadvantages found in the prior art mainly occur in that, there are quite specific units to attend a specific action, such as, for example, the removal of a single component in a mixture, as well as not having the opportunity to make modifications in its structure, not only that they can be moved from one side to another, depending on the site in the field where it is required, but also within its configuration, the possibility of altering its structure and making it feasible to carry out tasks regardless of the load, the level of waste handled nor the time that said waste must be attended, adding that the present invention adds safety elements to increase the quality of work with this type of waste.

The foregoing results in notorious disadvantages for the user as it prevents him from handling different congenital water treatment scenarios since he is in a fairly limited scenario, restricted to what the equipment can provide and practically prevents him from expanding his possibilities of operating in conditions for which it was not designed. For these reasons, there is a need for a process that offers the possibility of carrying out removal or treatment operations of congenital waters or oil production, which have a variety of polluting elements that can help in the treatment and thus achieve optimal results in the activities to be performed.

OBJECT OF THE INVENTION

Therefore, the present invention has the task of presenting an alternative that solves the previously described drawbacks that provides significant advantages in its utility, since it has advantageous characteristics in accordance with those described in the aforementioned documents, with a series of components in its structure that allows the operator to carry out removal and supervision tasks in the treatment of congenital water or oil production, where these activities can be carried out without complications and with the sole purpose of increasing the level of removal of oils and water polluting substances.

DESCRIPTION OF THE INVENTION

Figure 1:
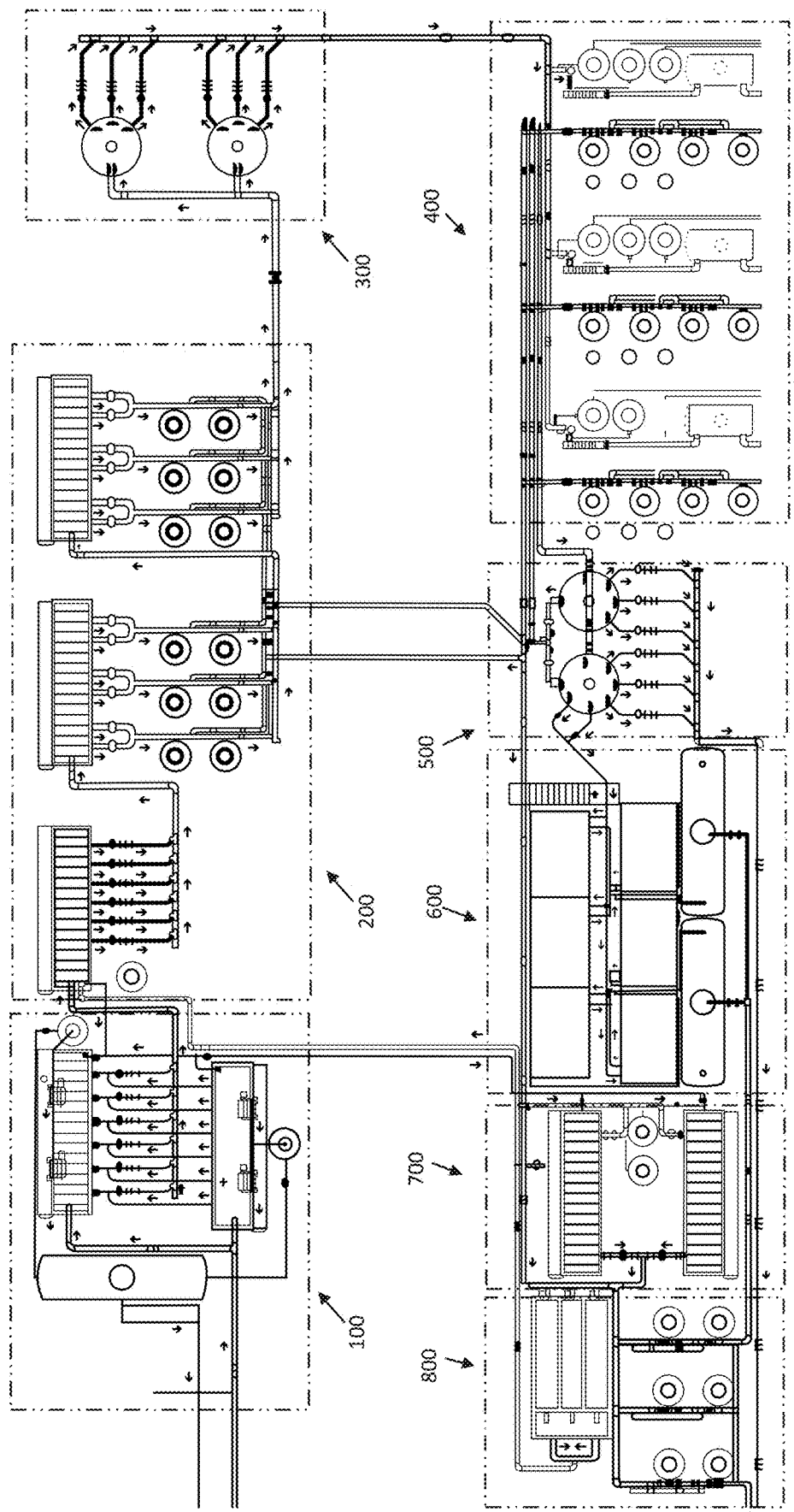
FIG. 1 shows a general plan view of the system for industrial and hydrocarbon wastewater treatment (1)
Figure 2:
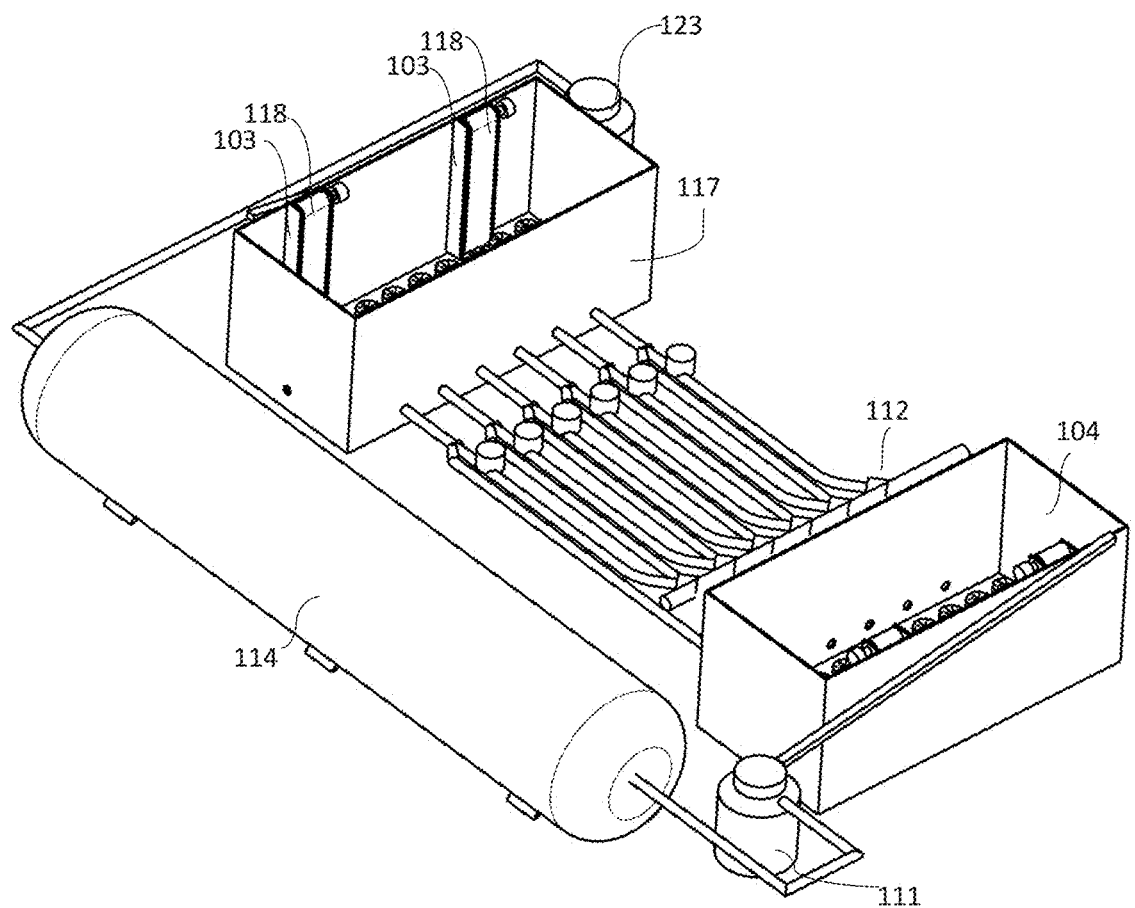
FIG. 2 shows an isometric view of the skimmer module (100) of the system for industrial and hydrocarbon wastewater treatment (1)
Figure 3:
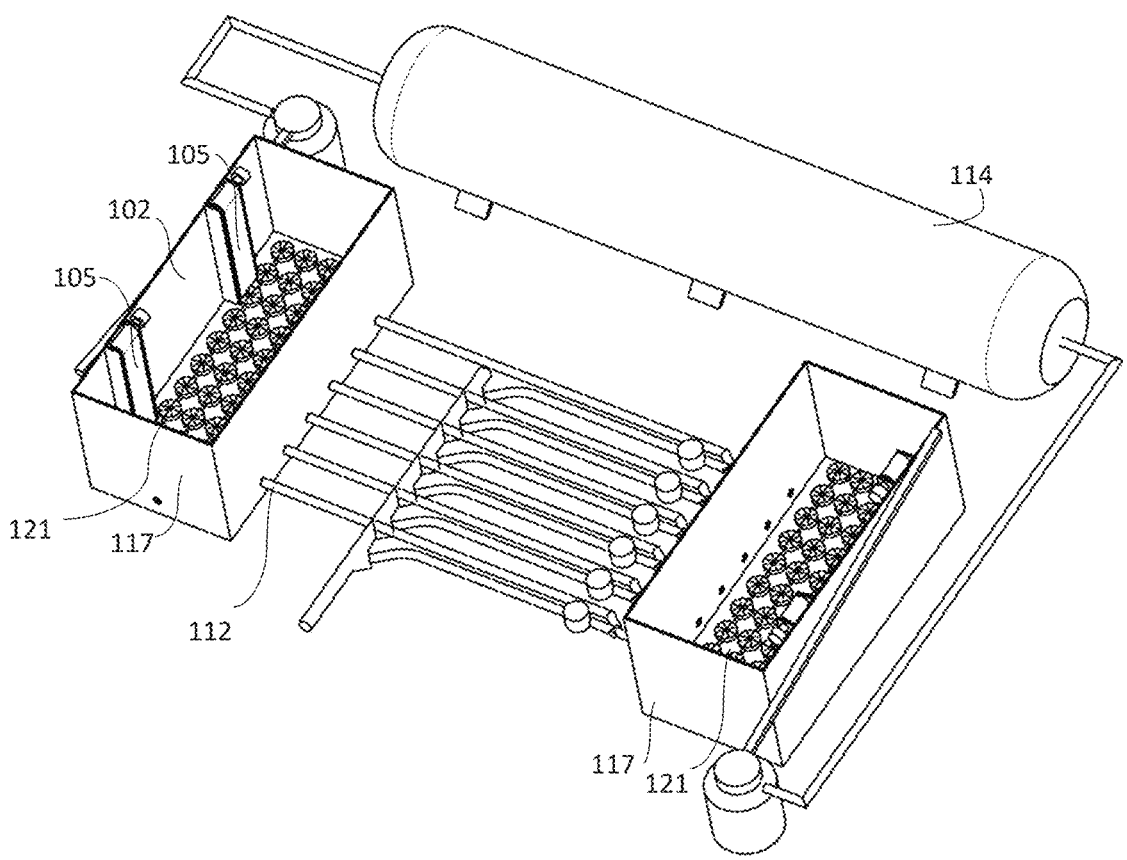
FIG. 3 shows an isometric view of the skimmer module (100 of the system for industrial and hydrocarbon wastewater treatment (1)

In order to promote understanding of the principles of the invention, reference will now be made to a preferred embodiment illustrated in the drawings, and specific language will be used to describe the same. However, it will be understood that therefore it is not intended to limit the scope of the invention, contemplating such additional alterations and modifications to the illustrated apparatus and further applications of the principles of the invention as illustrated therein, as would normally occur. now or in the future for one skilled in the art to which the invention relates.

The present invention refers to a system for industrial and hydrocarbon wastewater treatment, preferably those waters contaminated with hydrocarbons, wherein by means of a plurality of treatment modules and advantageously by means of electromagnetic pulses with low amperages, which are carried out using a plurality of cells with electrodes in the form of plates of composite alloy material, which has resulted in a proposal that allows, through the application of principles of chemistry and quantum physics, to dissociate the electrons from the atoms or chemical elements contained in water contaminated with hydrocarbons.

This invention advantageously allows the separation of water and oil in an efficient way, through the use of an electric current intensity, expressed in amperes found by an exact equation, the power differential, to create an electric field; for the breakdown of elements (electrons) with electronegative charges, to transform them into electropositive charges that neutralize them.

In one of its phases that includes a combined electrolytic process, it allows electronegative elements to become positive, achieving the cancellation of charges; consequently, when these elements are joined, a bivalence is created, which allows them to be deactivated, managing to eliminate harmful elements from the water being treated.

It has been found that the administration of electrical pulses with low amperage decomposes and regroups the chemical elements present in the water to be treated by means of an electromagnetic field, resulting in a potential difference, which allows the ionization of the chemical elements present. Electromagnetic pulsations materialize through the use of composite alloy plates, which act as anode and cathode, which are the ones that generate an electrical induction effect of the emulsified water droplets. The process is facilitated because water is made up of molecules, which have two hydrogen atoms with an electropositive charge and one electronegative oxygen atom, which easily dissociate and form other compounds that are easy to eliminate.

Some of the main pollutants from industrial wastewater and hydrocarbons are chemicals, radioactive substances, inorganic minerals, sediment formed by soil particles, and oil (spill). Therefore, congenital water is a wastewater effluent that is generated through the process of desalination and dehydration of crude oil, its properties depend on the type of oil that is extracted and processed, it can be light crude or heavy crude, as well same of the extraction techniques.

This water tends to contain high concentrations of inorganic salts and hydrocarbons, making it a dangerous waste to be dumped directly into the receiving bodies, in toxic compounds. In this case, the hydrocarbons hinder the oxygenation of the waters and consume the oxygen it needs for its own regeneration, and the pollution it causes prevents the photosynthesis essential for the development of phytoplankton. This is called contamination by crude oil and it is one of the most serious, the mass that is produced after the spill and floats, it is called a black tide.

To prevent negative environmental impact, it is necessary to implement alternative routes and among them is the treatment of congenital water for secondary recovery of their deposits.

The system for industrial and hydrocarbon wastewater treatment (1) is composed of a series of modules, perfectly defined where each one of them contributes a valuable element in the removal of pollutants from a mixture of water with hydrocarbons, they are in a first preferential embodiment, a skimmer module (100), an electrolysis module (200) and a coagulation-flocculation module (400), each of these modules being attachable and removable, being able to make different configurations that allow it to be located in a variety of specific spaces, for example in the field, where in addition these modules in each of their configurations have a modular arrangement that allows you to make these variations in the same module, depending on the needs of water to be treated:

In a second embodiment, the system for industrial and hydrocarbon wastewater treatment (1) is composed of a series of additional modules to the three aforementioned modules, having to be configured from a skimmer module (100), an electrolysis module (200), a transfer tank arrangement (300), a coagulation-flocculation module (400), a treated water module (500), an evaporator-condenser module (600), a sludge treatment module (700) and a mineralization module (800).

Preferably, the hydrocarbon wastewater treatment plant comprises an automation system, mainly made up of a Software designed based on the Algorithms that generate the quantum equations described above. Each phase of the system has a built-in PLC for the control of protection components, thermomagnetic switches, fuses, force components, variable speed drive for hydraulic pumps, contactors for motors, relays for handling solenoid valves, start-up of the control equipment.

The system of the present invention advantageously has a skimmer reactor that recovers the crude by moving the oil layers towards oil recovery tanks, by injecting gas or water; The gas injection is carried out by means of an arrangement of ejectors positioned at the bottom of the reactor, allowing a layer of hydrocarbons to form in the upper part that exits and moves by gravity to the recovery tanks through an angled outlet line located at less on one side of the reactor.

Figure 4:
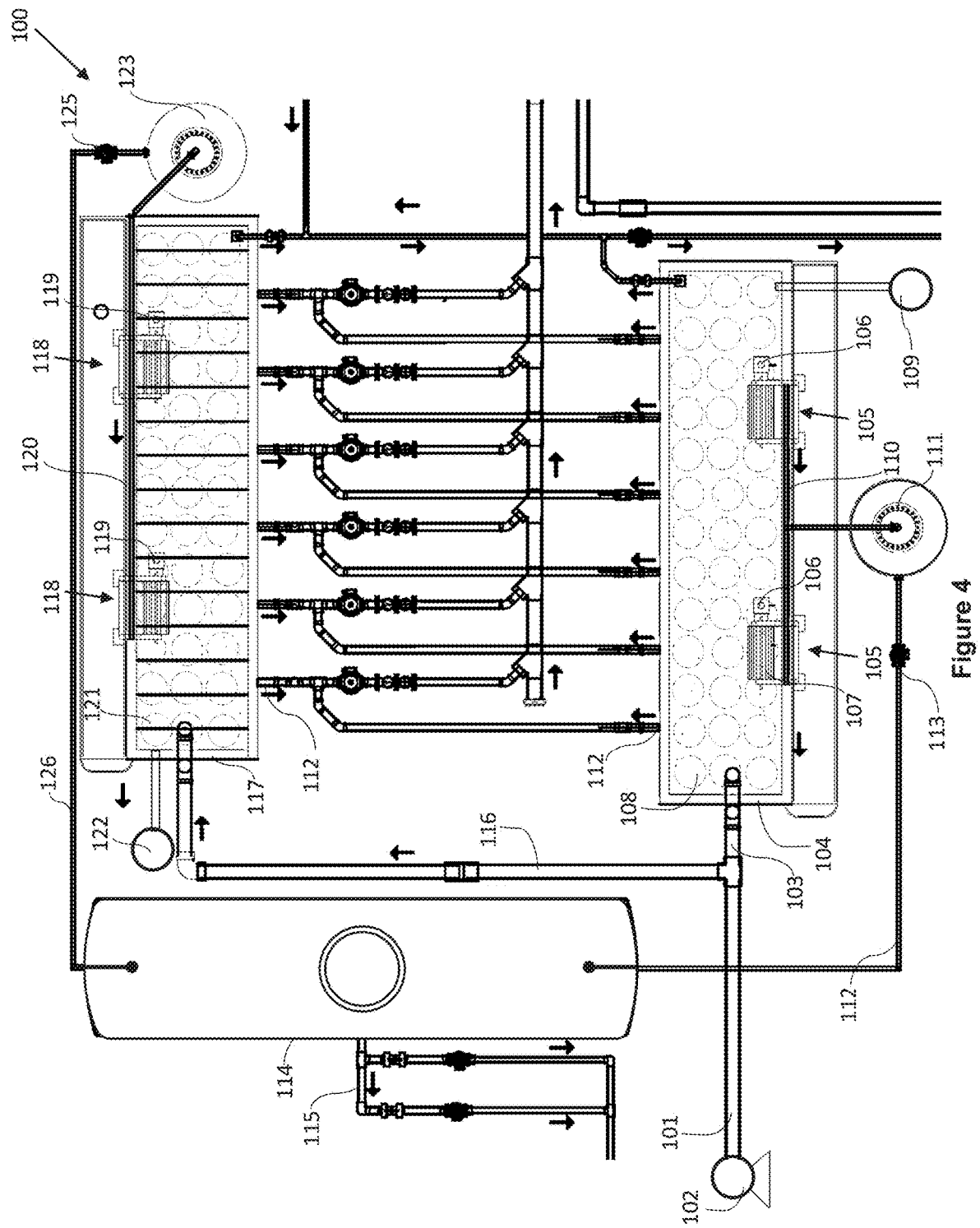
FIG. 4 shows a top view of the skimmer module (100 of the system for industrial and hydrocarbon wastewater treatment (1).
Figure 5:
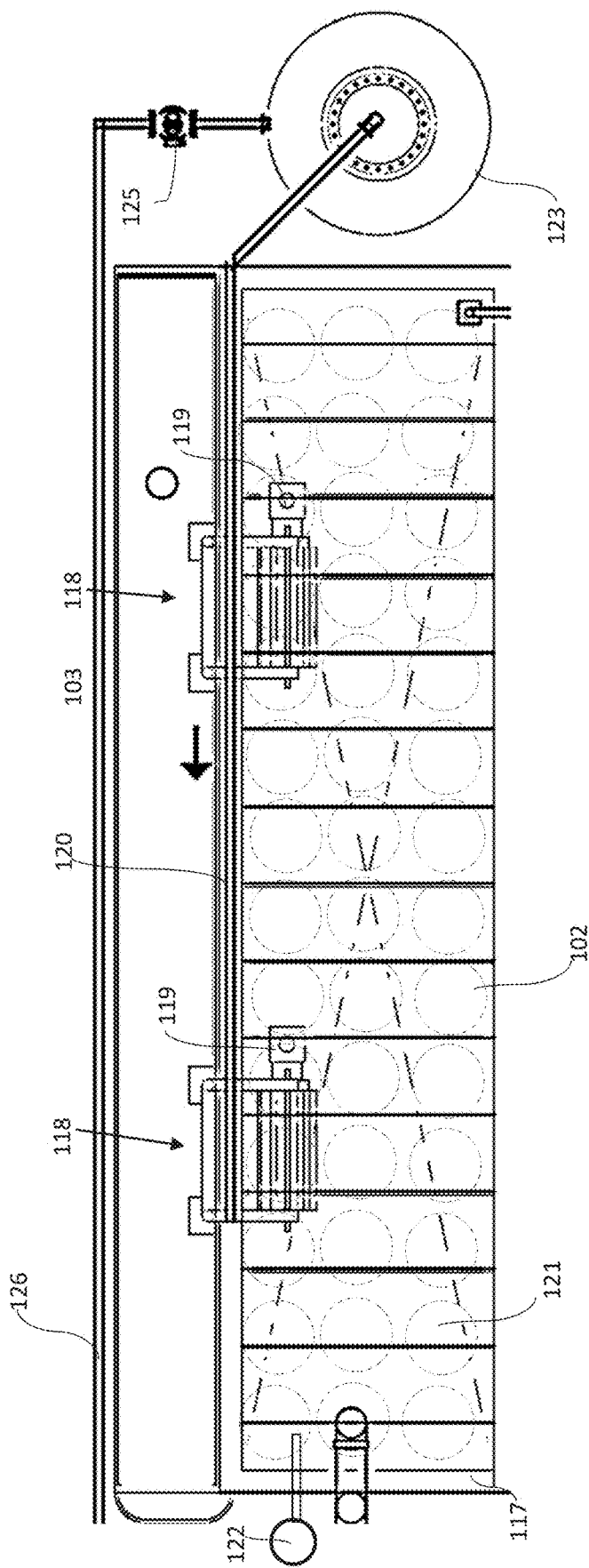
FIG. 5 shows a top view of a skimming container of the skimmer module (100) of the system for industrial and hydrocarbon wastewater treatment (1)
Figure 6:
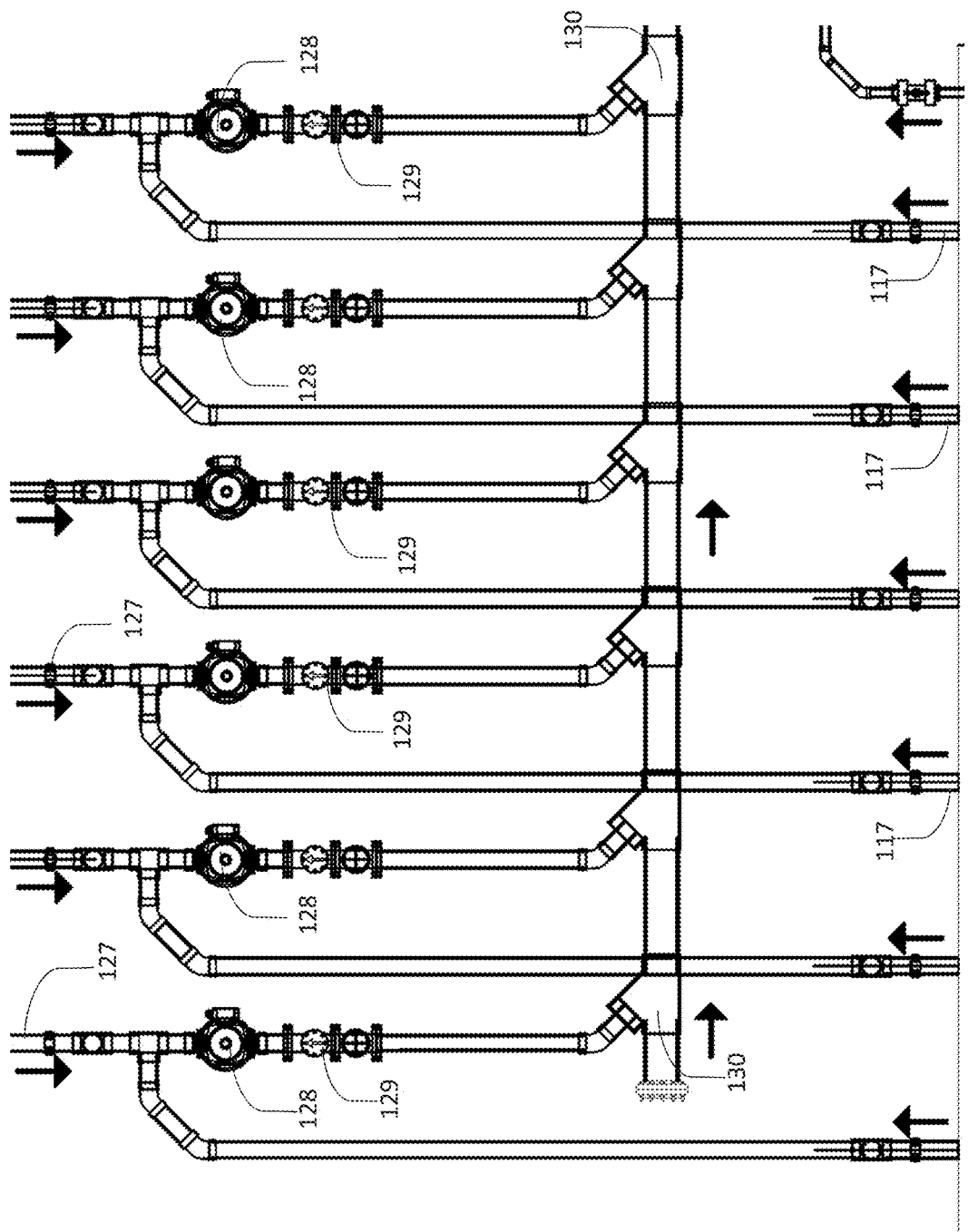
FIG. 6 shows a top view of the connectors of the containers of the skimmer module (100) of the system for industrial and hydrocarbon wastewater treatment (1)
Figure 7:
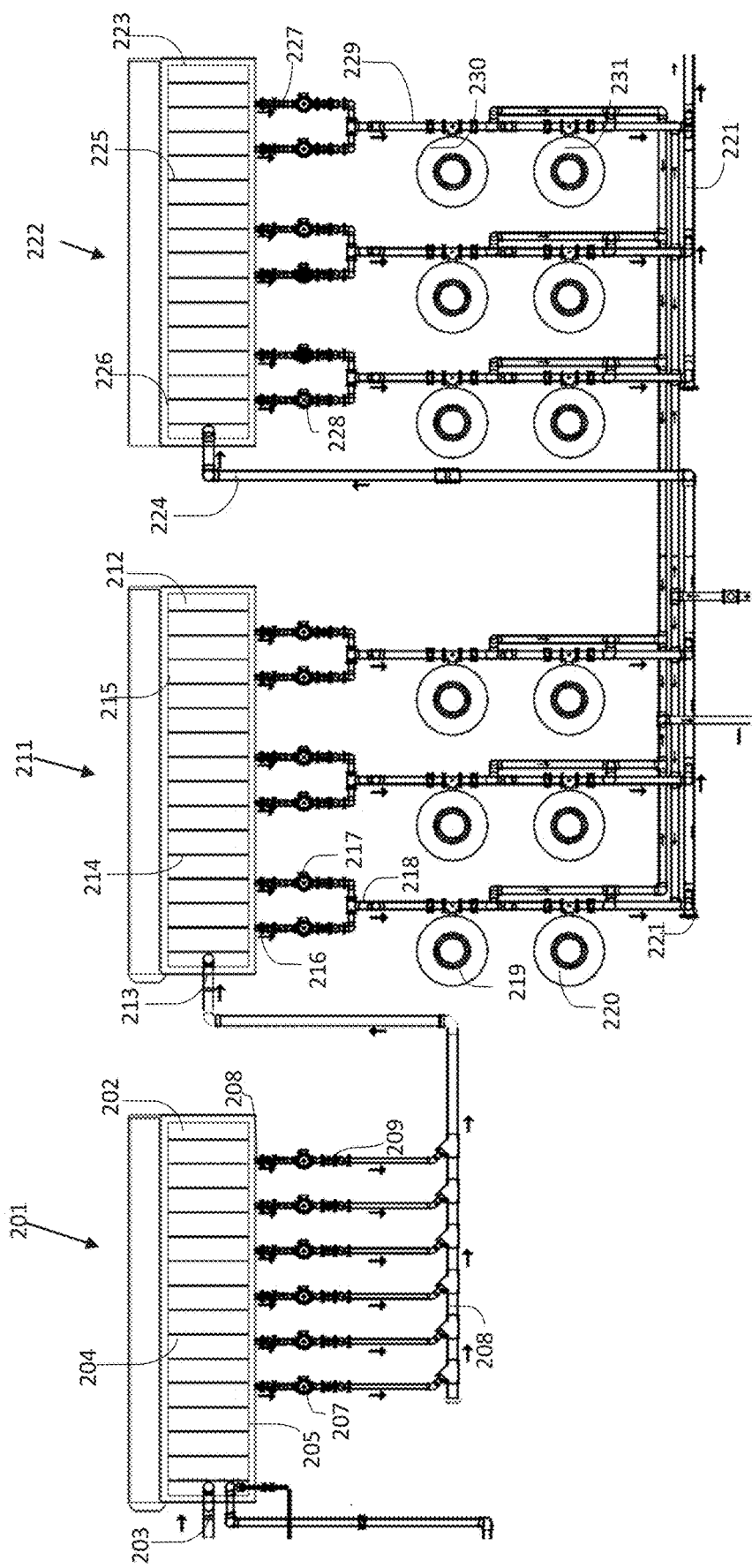
FIG. 7 shows a top view of one embodiment of the electrolysis module (200) to treat 16,000 barrels per day.
Figure 8:
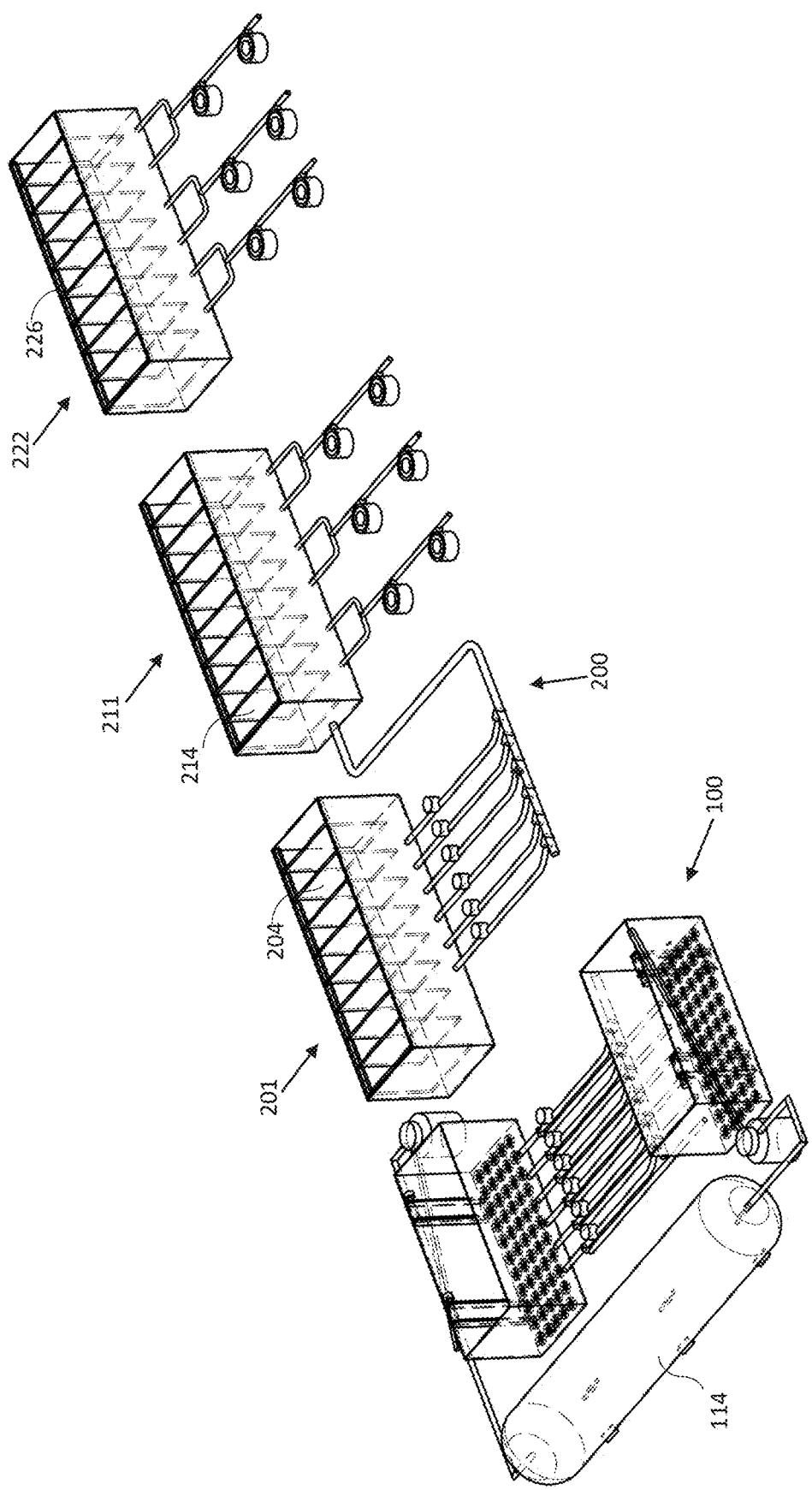
FIG. 8 shows an isometric view of the skimmer module (100) and the electrolysis module (200) of the system for industrial and hydrocarbon wastewater treatment (1)
Figure 9:
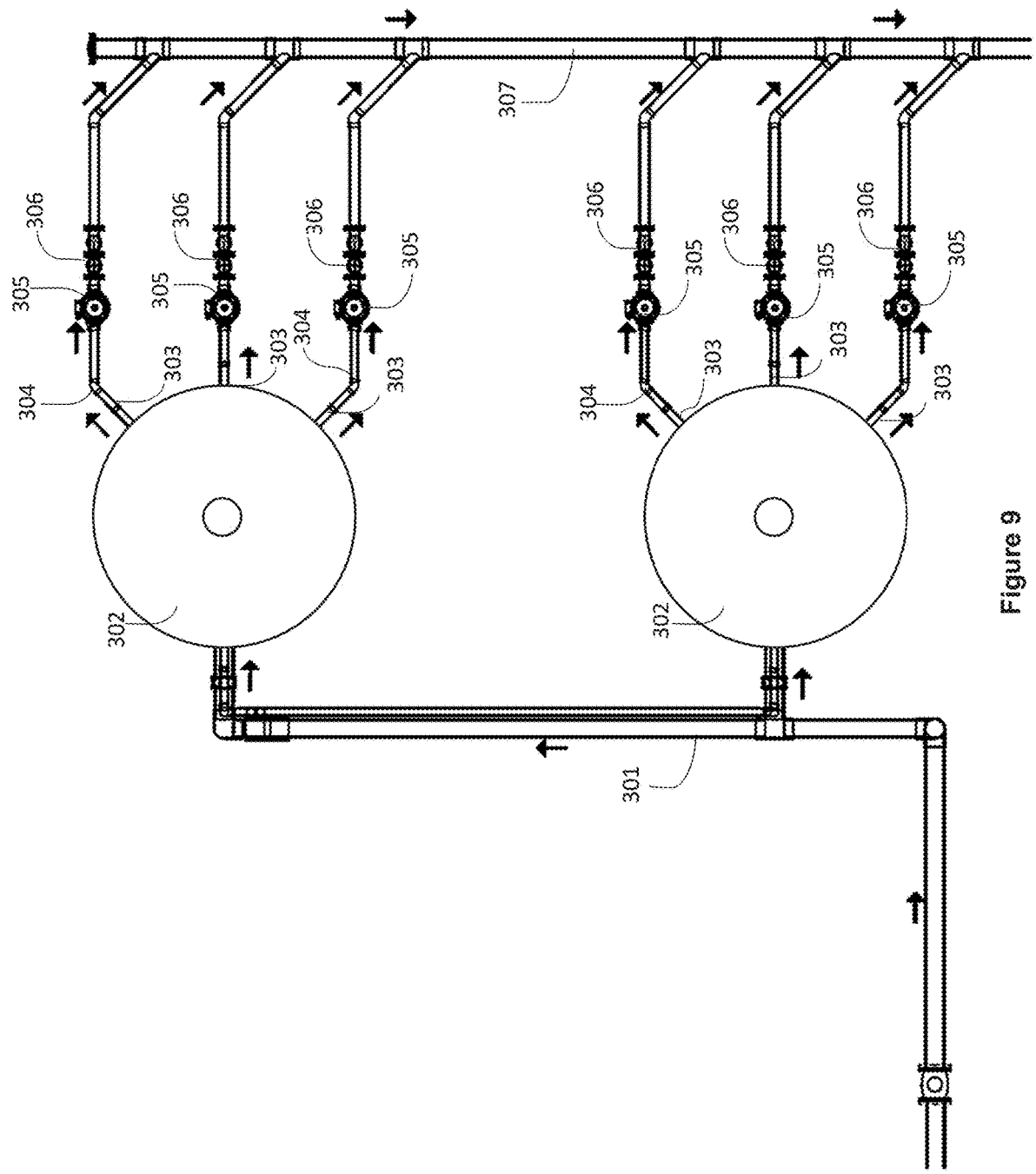
FIG. 9 shows a top view of the transfer tank arrangement (300) of the system for industrial and hydrocarbon wastewater treatment (1)
Figure 10:
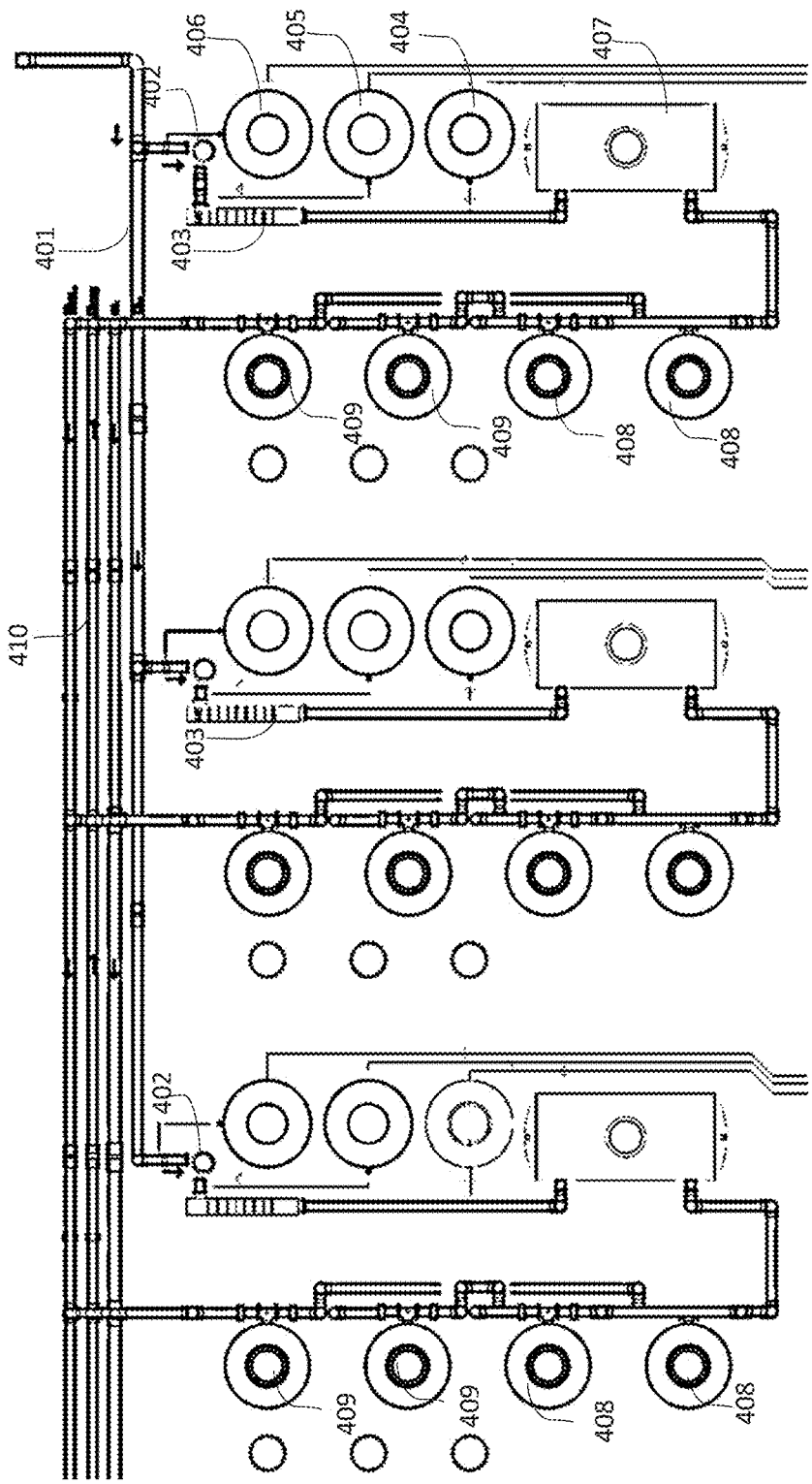
FIG. 10 shows a top view of the coagulation-flocculation module (400), of the system for industrial and hydrocarbon wastewater treatment (1).
Figure 11:
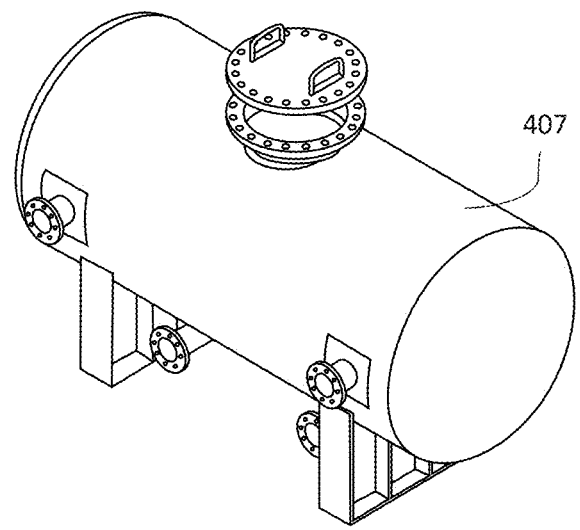
FIG. 11 shows an isometric view of a reactor of the coagulation-flocculation module (400), of the system for industrial and hydrocarbon wastewater treatment (1)
Figure 12:
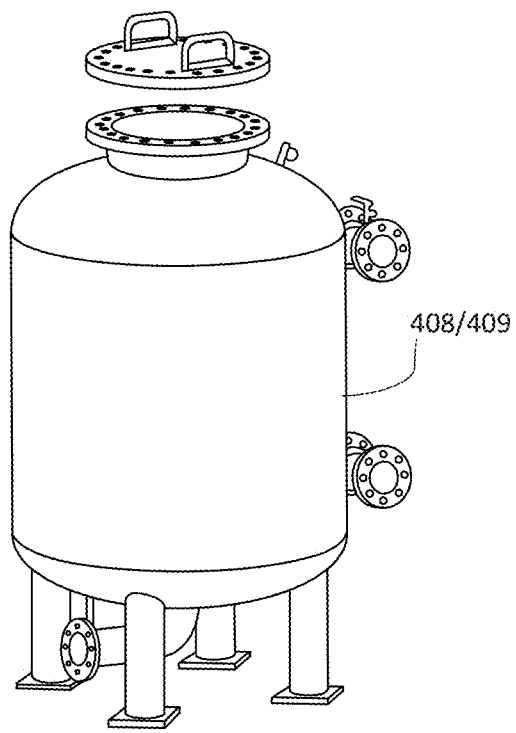
FIG. 12 shows an isometric view of a filter of the coagulation-flocculation module (400), of the system for industrial and hydrocarbon wastewater treatment (1)
Figure 13:
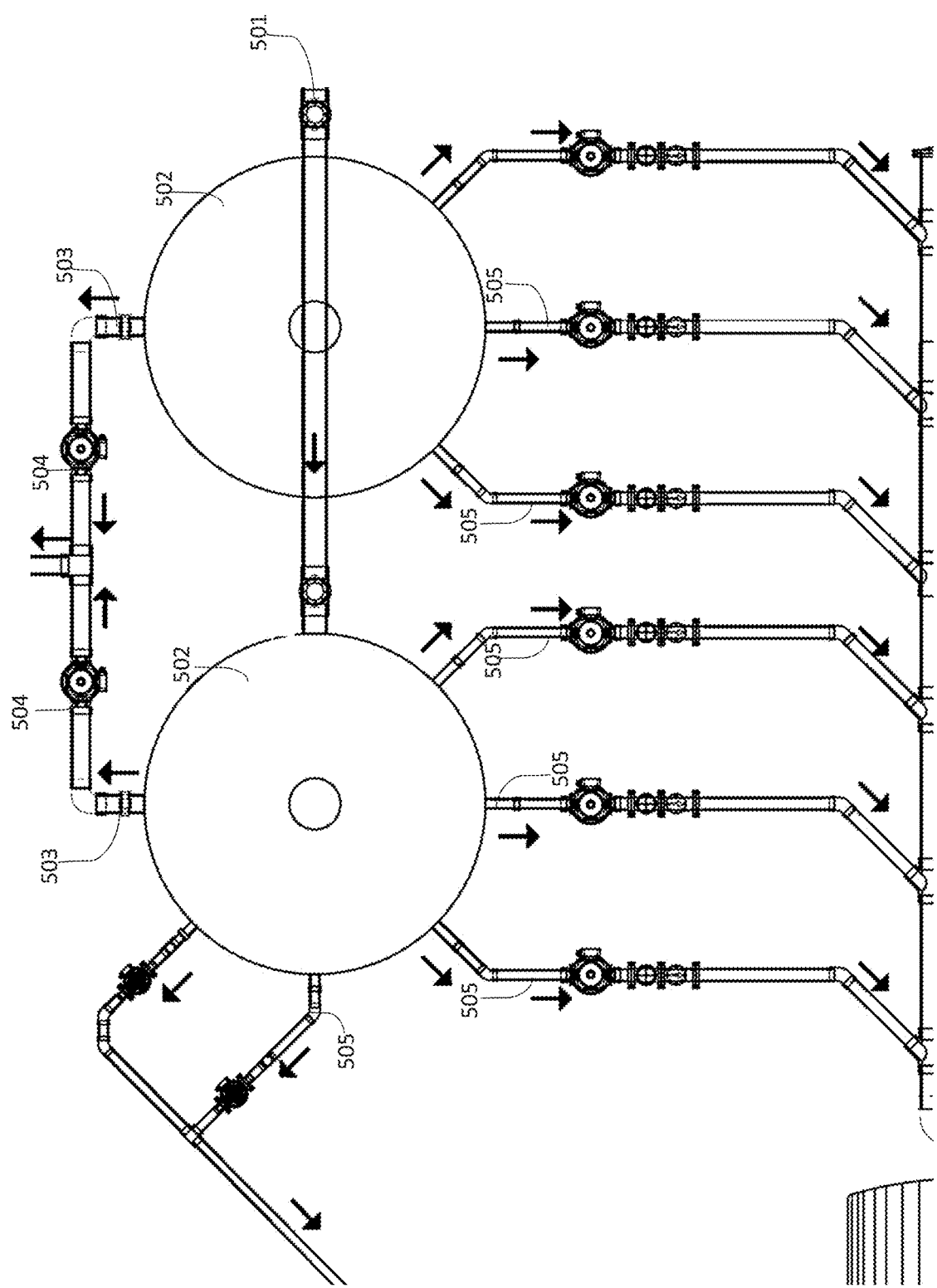
FIG. 13 shows a top view of a treated water module (500), of the system for industrial and hydrocarbon wastewater treatment (1)
Figure 14:
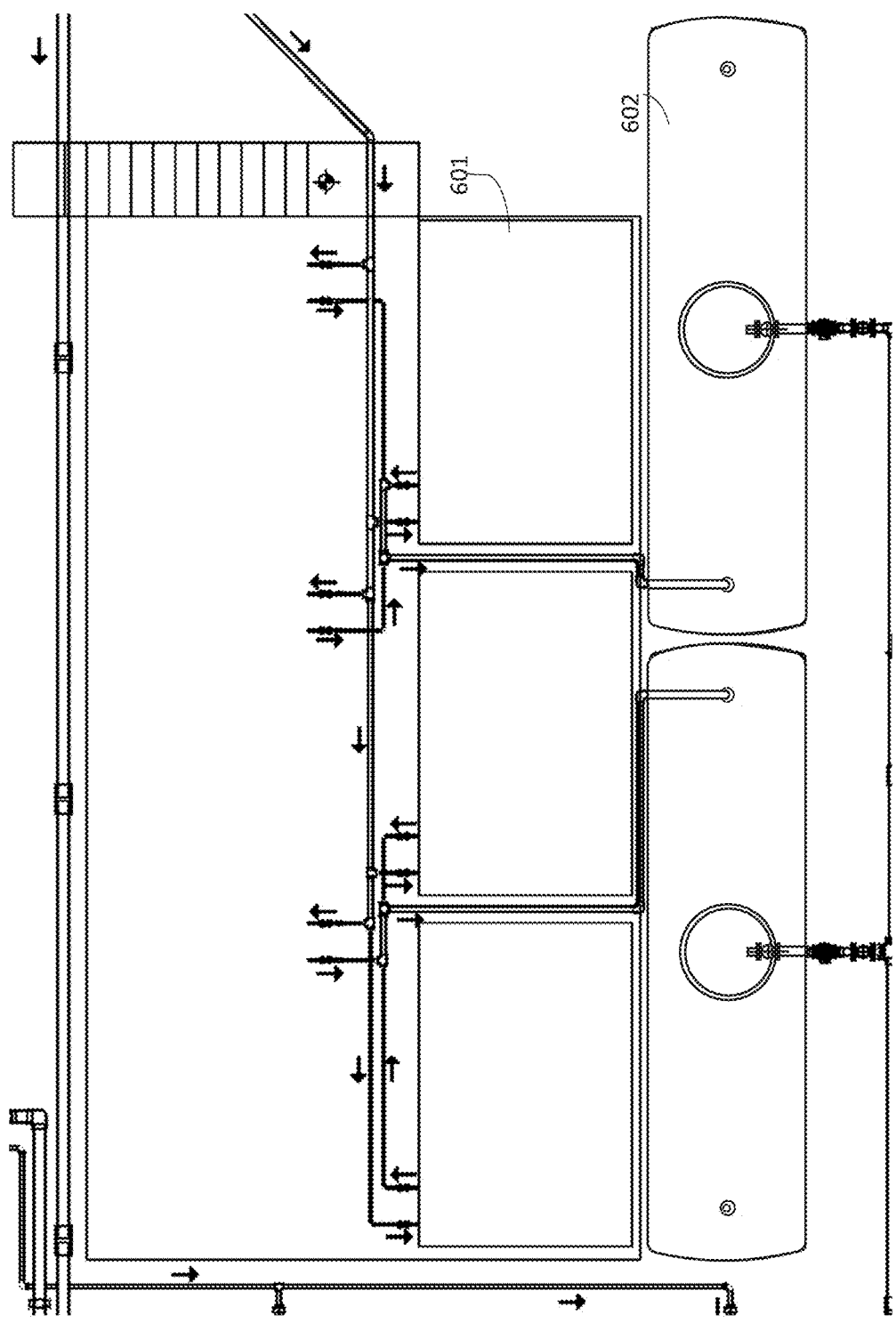
FIG. 14 shows a top view of the evaporator module (600) of the system for industrial and hydrocarbon wastewater treatment (1)
Figure 15:
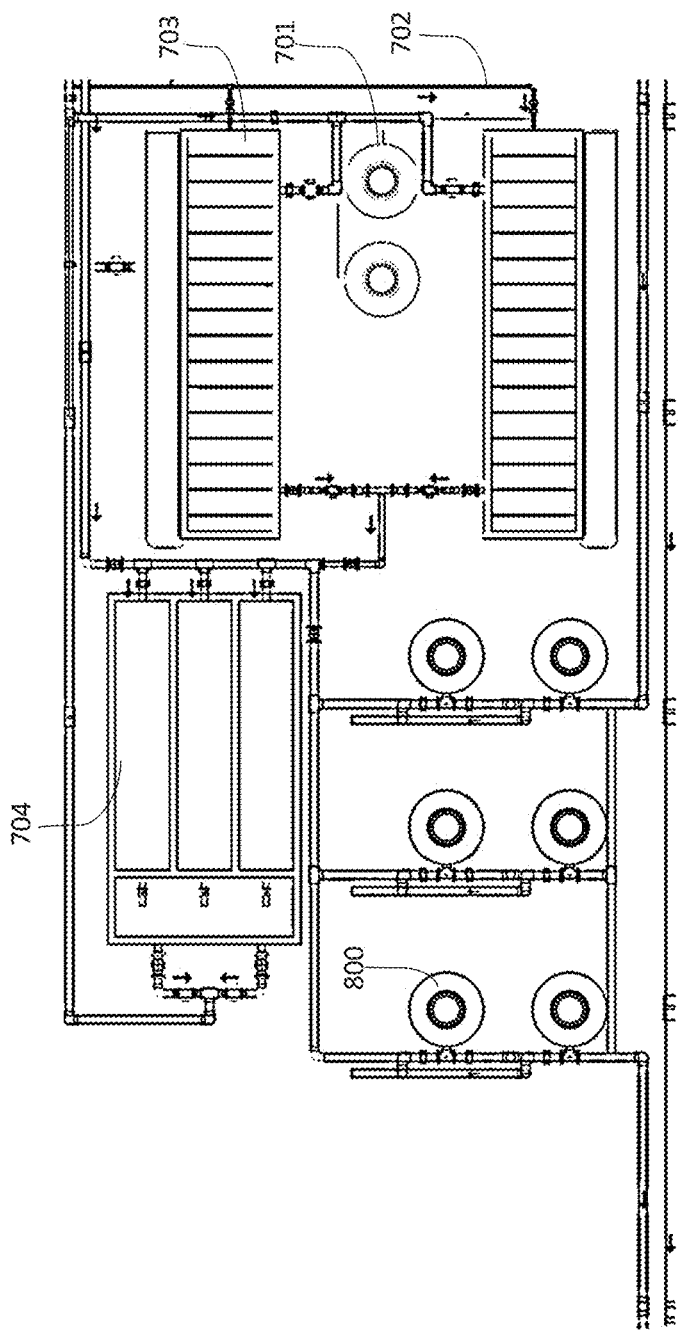
FIG. 15 shows a top view of the sludge treatment module (700) and the mineralization module (800) of the system for industrial and hydrocarbon wastewater treatment (1)
Figure 16:
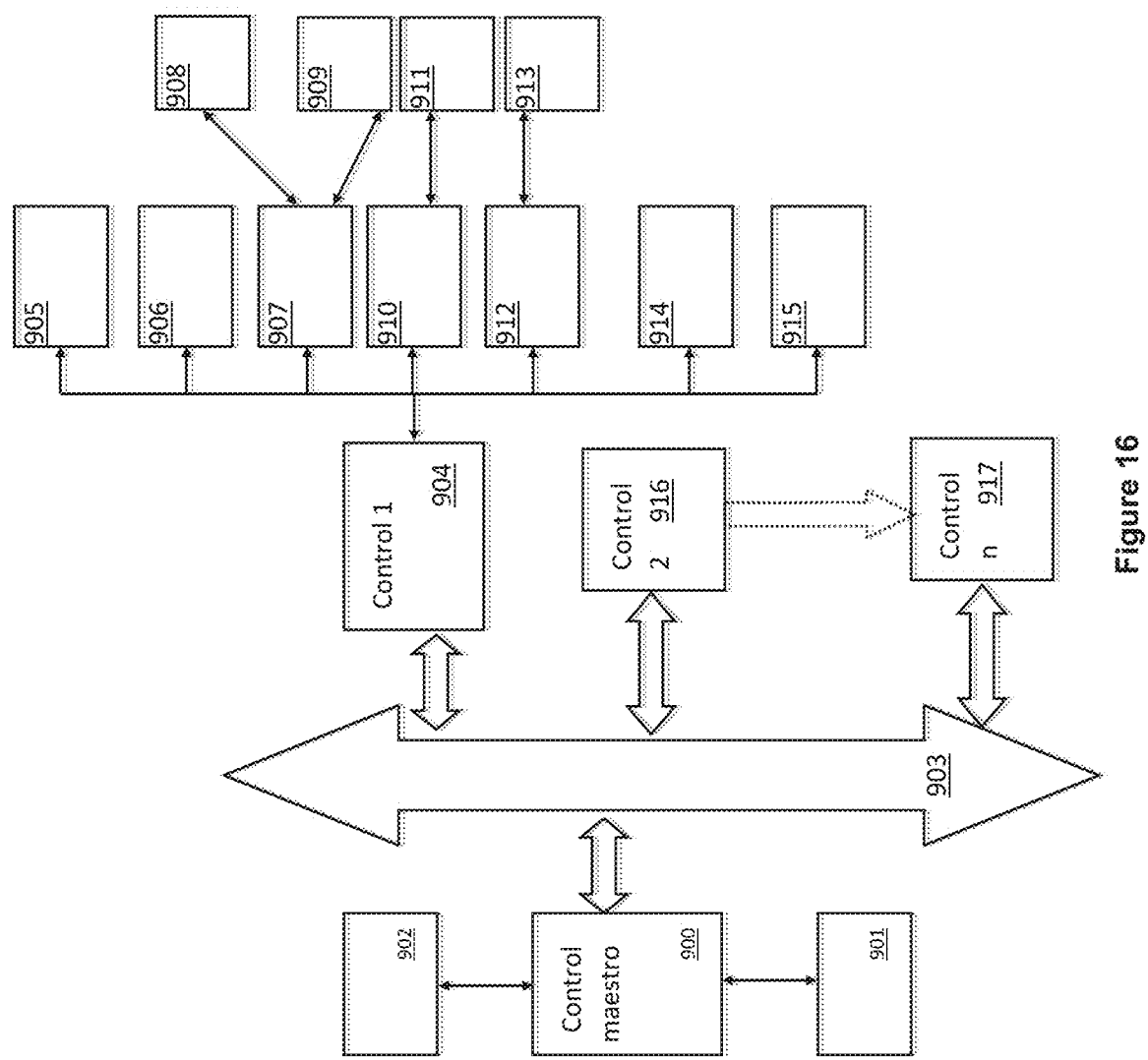
FIG. 16 shows the block diagram of the control of the system for industrial and hydrocarbon wastewater treatment (1).

The system for industrial and hydrocarbon wastewater treatment (1) preferably comprises a skimmer module (100), which is coupled to an electrical generator (not shown) that provides the supply of electrical energy for the required processes, energizing a panel of control (not shown), from where the stop and start of the components used is operated or manipulated as the case may be; In addition, it has a series of thermo-magnetic switches, as a protection measure in the event of an electrical overload; The skimmer module (100), is integrated, as can be seen in FIG. 4, first of a feed line (101) which can be considered the initial and main power line of the system, since through this there is the entry of the water to be treated, where this line, assisted by a hydraulic pump (102) promotes the insertion of the fluid towards a primary feeder (103) where it connects with said hydraulic pump (102) at its inlet, while At its outlet it is connected to a skimming container (104), at a height close to the internal part thereof, in turn this skimming container (104) preferably has on at least one of its internal walls, the coupling of the except for a skimmer (105) integrated in turn by a skimming motor (106) with a preferential power of ¾" HP and a voltage of 220 V that promotes the movement of a skimming band (107) where it drags the oil contained in congenital water and deposit it located in an outlet tray (110) that is arranged at one of the upper ends of the skimmer (105), likewise the skimming container (104) has in its lower part a plurality of fine bubble diffusers (108) whose distribution It is arranged so that they cover most of the lower surface of the skimming container (104), and where these fine bubble diffusers (108) are connected in turn with an air compressor (109) that sends a flow of air at a preferred pressure of between 250 and 350 psi, more preferred between 270 and 330 psi and still more preferred between 290 and 310 psi, the outlet of which is given by means of the diffuser head which in turn has a plurality of holes Passes that are the means of passage of the air injected by the compressor (109) that when leaving said head is enveloped by a layer of congenital water and that when rising promotes a drag of said layer, and its oil components towards the surface, which is also a taken advantage of by the skimmer (105) that drags the oil from an area with a higher concentration of the same, so that its removal from the mixture with water is more efficient, and in this way, the outlet tray (110) has with a greater accumulation of oils that, at this stage of the procedure, are deposited in an external container (111), which is arranged at the outlet of the outlet tray (110) and that at a point on its periphery has an outlet external container (112) which is fed by an outlet pump (113) of 2 HP three-phase at 5.8 Amp. At 220 V that is connected to a feeder that deposits the recovered oil in a general oil container (114), which preferentially, in its middle part has a bypass valve, which opens c hen the tank is at its maximum capacity, removing the oil for a secondary process, for reinsertion in the skimming or for an additional treatment, in any of the cases this output is given through an oil container (115) whose arrangement is preferably applied in a dual manner, each of these outlets having an outlet pump that causes a faster emptying of the container (114).

On a further embodiment, there is a secondary feeder (116) as an extension coming from a specific area and close to the entrance of the skimming container (104), where this secondary feeder (116) is connected to a second skimming container (117), where it has, preferably in at least one of its internal walls, the coupling of at least one skimmer (118) integrated in turn by a skimming motor (119) with a preferential power of ¾" HP and a voltage of 220 V that promotes the movement of a skimming band (120) where it drags the oil contained in the congenital water and deposits it in an outlet tray that is arranged at one of the upper ends of the skimming container (117), also the skimming container (117) has in its lower part a plurality of fine bubble diffusers (121) whose distribution is arranged so that they cover most of the lower surface of the skimming container (117), and where these fine bubble diffusers (121) are connected in turn with an air compressor (122) that sends a flow of air at a preferred pressure of between 250 and 350 psi more preferred between 270 and 330 psi and even more preferred between 290 and 310 psi, whose output is given by means of the diffuser head which in turn has a plurality of through holes that are the means of passage of the air injected by the air compressor (122) that when exiting said head is enveloped by a layer of congenital water and that when rising promotes a drag of said layer, and its oil components towards the surface, which is also used by the skimmer (118) that drags the oil from an area with a higher concentration of it, so its removal from the mixture with water is more efficient, and in this way, in the salting tray there is a greater accumulation of oils which, at this stage of the procedure are stored in an external container (123), which is arranged at the outlet of the exit tray and that at a point on its periphery has an external container outlet (124) which is fed by an outlet pump (125) of 2 HP three-phase at 5.8 Amp. At 220 V that is connected to a feeder (126) that deposits the recovered oil in the general oil container (114), at the opposite end of where it has the connection of the oil outlet of the skimming container (104).

In this second embodiment of the invention, there is the incorporation of a connection arrangement between these two skimming containers (104/117) where this connection is given by means of a plurality of side connectors (127), located in a zone close to the middle zone of each of the containers, where these side connectors (127) are connected, in a zone close to one of these and where next to this connection a central pumping means (128) is coupled that generates the expulsion of water reduced in oil inside each of the skimming containers, where it passes through a parameter measurement module (129) where there are means for measuring temperature, pH, conductivity, acid hydrogen sulfide, high level sensors and low level sensors towards the electrolysis module, which after passing through these, the treated mixture is inserted into an electrolysis feeder (130) that is arranged in the central part of the connector arrangement and that sends the mixture from the skimming module to the electrolysis module (200).

For the portion of the actuation of each one of the components and input of each of the control phases of this skimmer module, there is a control center where, by means of a series of control means, the on and off are promoted of the hydraulic pump (102) for the entry of the congenital water mixture towards the skimming module, subsequently, in each of the inlets of the skimming containers (104)/(107) there is a bypass valve (104A) (107A), where their operation depends on the filling level of each of the containers, while the skimming container (104) is at its optimal operating level, which is preferably determined by a height sensor (104B). or a buoy that is installed on the top, the skimming motors (106) are operating to release the oil, while in this scenario, the skimming motors (119) are off, in the same sense with the valves (104A) (107A) while one is open to allow the filling of the container, the other remains closed to allow the optimal operation of the skimmers and achieve an effective removal of the oil present in the mixture, thus ensuring the transfer of the containers.

The electrolysis module (200) of the present invention is integrated, fundamentally by a preferential arrangement of three electrolysis reactors (201) (211) (222) for the treatment of wastewater where these are specially designed to carry out a treatment of congenital waters, oily waters, from the extraction of gas and oil from the subsoil (fracking) or waters with hydrocarbon residues, oils and other elements that are preferably integrated into the water during hydrocarbon extraction processes, without this implying any limitation on the water to be treated.

This electrolysis module (200) is connected to the skimmer module (100), where for said electrolysis module, the energy supply is provided by a plurality of rectifiers (not shown), in charge of providing the electrical supply to carry out the process. electrolytic.

The electrolysis module is specially designed to effectively treat congenital or oil-produced waters, with this operation, it is possible to recover the hydrocarbon and in turn give a quality treatment to the treated water. This prevents oil production water from continuing to be disposed of in rivers and seas.

As mentioned, the electrolysis module for wastewater treatment is specially designed to treat congenital water, oily water, from the extraction of gas and oil from the subsoil (fracking) or water with hydrocarbon residues, oils, and others. elements that are preferably integrated into the water during hydrocarbon extraction processes, without this implying any limitation on the water to be treated.

Preferably, the primary reactor (201) comprises at least one reaction chamber (202) which in turn is provided with a plurality of inlet valves (203) arranged at one of its ends and feeding the mixture to this reaction chamber where there are a plurality of plates (204), preferably made of stainless steel as anode and cathode inside the electrolysis rector, where they are held at each of their ends assisted by a support bar (205) that is arranged in an area near the top of each of the walls of this primary reactor, allowing the movement of each plate that preferentially finds a location equidistant from the other plates (204) inserted in the reactor, of at least 30 cm, preferably 40 cm and more preferably 50 cm, where in turn these plates (204) have an operating range of 0-60 volts and 0-1250 Ampere s of direct or direct current and that are applied constantly during the electrolysis cycle of the water to be treated where they have a period of time of 7 minutes and treating 24 I/sec. In the lower part of the primary reactor, there are a plurality of means of egress (206), where in each of these modules a hydraulic pump (207) with a power of 2HP is connected that helps in the removal of the mixture inside and that deposits it in a primary collector (208) that directs the mixture towards a secondary reactor (211) for a second electrolytic treatment; each of the means of egress (206) has a bypass valve that can be open or closed depending on the need for rapid extraction, where a faster or slower outlet may be required depending on the process carried out. configuration allows maintenance without the need to stop the electrolysis line, since this reactor can operate at its outlet with up to 2 means of egress (206), in the same sense it has a parameter measurement module (209) where you have sensors that perform measurements of temperature, PH, conductivity, and hydrogen sulfide.

In one modality considered, the system has the advantage of installing a secondary reactor (211) in fluid communication with the primary reactor (201) located in the same way within what makes up the electrolysis module, where there is a chamber of reaction (212) which in turn is provided with an inlet valve (213) arranged at one of its ends and which feeds the mixture to this reaction chamber where there are a plurality of plates (214), manufactured preferably made of stainless steel as anode and cathode inside the electrolysis rector, where these are held at each of its ends aided by a support bar (215) that is arranged in an area near the top of the each of the walls of this secondary reactor, allowing the movement of each plate that preferentially finds a location equidistant from the other plates (214) inserted in the reactor, of at least 30 cm, p 40 cm and more preferably 50 cm, where in turn these plates (214) have an operating range of 0-60 volts and 0-1250 Amps of direct or direct current and that are applied constantly during the electrolysis cycle that has the water to be treated where they have a period of time of 7 minutes and treating 24 I/sec. In the lower part of the primary reactor, there are a plurality of outlet means (216), where these are arranged in a dual arrangement, where in each of these outlets there is a hydraulic pump (217) 2 HP 220 V which draws the mixture.

Optionally, the electrolysis module is in communication with a filter arrangement that provides a first step for solids removal. Furthermore, the water leaving the filters can be stored in one or more storage tanks, depending on the flow of the treated water.

According to the contaminants in the water to be treated, optionally and advantageously the outlet means (216) can direct the water to an inlet of a filter inlet (218) where it operates with sand (219) and carbon filters. (220), to refine the water to be treated, where the water that comes out of the mixture is directed towards an outlet manifold (221) that can deposit the water in an additional option of a third electrolysis module (222) that of Similarly, it has a reaction chamber (223) which in turn is provided with an inlet valve (224) arranged at one of its ends and which feeds the mixture to this reaction chamber where a plurality of plates (225), preferably made of stainless steel as anode and cathode inside the electrolysis rector, where these are held at each of their ends aided by a support bar (226) that is arranged in an area near the top of each of the walls of this secondary reactor, allowing the movement of each plate which preferentially finds an equidistant location with respect to the other plates inserted in the reactor, of at least 30 cm, preferably 40 cm and more preferably 50 cm, in where in turn these plates have an operating range of 0-60 volts and 0-1250 Amps of direct or direct current and that are applied constantly during the electrolysis cycle that the water to be treated in where these have a period of time of 7 minutes and treating 24 I/sec. In the lower part of the primary reactor, there are a plurality of outlet means (227), where these are arranged in a dual arrangement, where in each of these outlets there is a hydraulic pump (228) 2 HP 220 V that extracts the mixture and unites it in a filter inlet (229) where there is a filtration arrangement where it operates with sand (230) and carbon (231) filters, to refine the water to be treated, where the water that comes out of the mixture is directed towards an electrolysis outlet manifold (221) that deposits the mixture in an arrangement of transfer tanks.

In one embodiment, the electrolysis module (200) comprises an arrangement of fluid lines with solenoid valves controlled by a master control to control the hydraulic residence time and consequently the rates of electrical supply to the panel, the valves having to operate in a process of opening and closing in a coordinated manner, since electrolysis is applied constantly and simultaneously in each of the reactors during this module of the invention.

In an additional embodiment of the electrolysis module (200), it must have a cover on the upper part in the manner of a bell (not shown) where it functions as a means of capturing hydrogen and oxygen, since through the process electrolytic water decomposes to form hydrogen and oxygen, as a result of carrying out the reverse process to the hydrogen combustion reaction (3), where it is necessary that for this reaction the energy contribution in the form of electrical energy is supplied by the plates (204), where the electrolysis process causes the water to dissociate, forming hydrogen in the cathode and oxygen in the anode, in addition, fossil fuels carry hydrogen, because they contain it in their molecule so they to obtain it as hydrogen gas, the reaction with congenital water works, where a catalyst agent is preferably used to promote a faster reaction.

In the electrolysis module, electromagnetic pulses with low amperages are supplied by means of plates (204) (214) (225) made of composite alloys (Anodes + and Cathodes −), which separate or dissociate the electrons of an atom, generating other physical elements —chemicals, which can be precipitated, canceling the electric charges; also solids that settle, aided by differences in densities, so that, for example, the hydrocarbon still present sulfur (As) hydrogen sulfide gas, is transformed into hydrogen by the effect of an electric induction field, obtained from a Differential of Power, determined by the following equation:

$$E=q$$

$$F=K\ q1q2$$

$$r2$$

$$r2$$

$$Fq1 \rightarrow q2 = -Fq2 \rightarrow q1;$$

$$G=U-TS+PV$$

Neutralización del Sulfhídrico:

$$H2\ S+2NaOH \rightarrow *Na2\ S+2\ H2O$$

According to Coulomb's Law, it is established as the force between two-point electric charges, it constitutes the starting point of Electrostatics as a quantitative science. A point charge is understood to be an electric charge located at a geometric point in space. A point charge can constitute one in the study of the interaction between electrically charged bodies whose dimensions are exceedingly small compared to the distance between them. Coulomb's Law says that "the electrostatic force between two-point charges is proportional to the product of the charges and inversely proportional to the square of the distance that separates them, and has the direction of the line that joins them. The force is repulsive if the charges are of the same sign, and of attraction if they are of the opposite sign".

It is important to note the following points in relation to Coulomb's law:

A) when speaking of the force between electric charges, it is assumed that they are at rest (hence the name of Electrostatics).

Note that the electric force is a vector quantity, it has magnitude, direction, and sense.

B) electrostatic forces comply with Newton's third law (law of action and reaction); that is, the forces that two-point electric charges exert on each other are equal in module and direction, but in the opposite direction:

$$Fq1 \rightarrow q2 = -Fq2 \rightarrow q1;$$

In mathematical terms, this law refers to the magnitude F of the force that each of the two-point charge q 1 and q 2 exerts on the other separated by a distance r and is expressed in the form of an equation as:

k is a constant known as the Coulomb constant and the bars denote absolute value.

F is the force vector that electric charges undergo. It can be attractive or repulsive, depending on the sign that appears (depending on whether the charges are positive or negative).

If the charges are of opposite sign (+ and −), the force "F" will be negative, which indicates attraction.

If the charges are of the same sign (− and − or + and +), the force "F" will be positive, indicating repulsion.

The electric charges used in the present invention are used to supply the energy in the cells to the interior of the containers and first provide a flow of alternating current from a power network that later has a transformation in its power parameters; having a supply or input voltage in the primary of a transformer with a range of 220-440 VAC with an operating power of between 15 and 18 watts as well as a current of 40 A of alternating current, Coulomb's Laws are fulfilled and the Gibbs free energy so that they have an output in the secondary of said transformer with a voltage of at least 15 VDC and a current flow of at least 100 A of DC in a second stage. The reactor incorporates cells in the form of plates to which Amperage is applied, the result of the quantum equation, previously described, obtains a specific electric charge to create the electric field, the equation allows determining the "exact power differential" obtaining the force which requires the atomic weight of each chemical element to be dissociated. That is, an intense bombardment of ions is created that provides an exact power to separate the electrons from their orbit. Once the separation of electrons is done, they tend to join each other, creating a chemical Bivalence, which causes their electrochemical charges to cancel out. By canceling the hydrogen sulfide (H2S) contained in the oil formation water, said harmful elements, dissolved solids, can be transformed into suspended solids (NaCl, As, Ci, PI, Cr) creating chlorine or hydrogen gas; that, when dissolved in water, do not generate impacts to the environment.

In a preferred embodiment, the system of the present invention can comprise a transfer tank module (300) to store the treated water, where these have feeding means (301), with a connection to at least one storage tank (302) with a preferential capacity of at least 30,000 cubic meters, more preferably 25,000 cubic meters and still more preferred, 22,000 cubic meters that fulfill the function of being a storage medium for the fluid treated in the electrolysis module that have a series of filling sensors and each of these has an outlet arrangement (303), preferably made up of three connection means (304) where each of these has a pumping means (305) and a restriction means of passage (306) that help in the extraction of the treated water for its transfer to the flocculation coagulation module, for which they are finally channeled into a transfer outlet (307) that collect to all conductors of the connecting means.

The coagulation-flocculation module (400) of the present invention has a series of components where, in addition to various attachments, a coagulating agent is added to the water to create an attraction between the suspended particles. The mixture is slowly agitated to induce clumping of the particles together to form "flocs." The water is then transferred to a sedimentation tank (not shown) to settle the solids, a portion of chlorine is added to the mixture and the pH is subsequently regulated depending on its level by means of a pH adjusting agent, preferably sulfuric acid or hydroxide. of sodium, then it is entered into a static mixer where a flocculating agent is added, preferably aluminum polyhydroxy chloride in a ratio of 1-1.5 with the previously added chlorine in order that the water that brings dissolved heavy metals is oxidized, later they have three silica sand filters and one activated carbon filter.

In the coagulation-flocculation module (400) there are means for this process where they act in parallel, treating a quantity of 24 liters/second of the mixture from the electrolysis module, firstly the supply to this module is given by means of a general feeder (401) that inserts the mixture for its entry by means of a hydrocyclone (402), mainly intended for the separation of solid-liquid suspensions, where the thicker particles rotate close to the wall of the hydrocyclone and due to the effect of centrifugal acceleration, are evacuated through a nozzle in the form of a thick mass composed of oils remaining from previous processes and where due to the reduced dimensions of said nozzle, only a part of the suspension is discharged and It is deposited in a sludge chamber (not shown), creating in the lower vertex a secondary vortex with an upward trajectory, which is where the separation occurs as the greatest tangential accelerations are generated at this point; wherein this current drags the fine particles together with most of the liquid to the overflow, which is discharged through a central tube located in the upper cylindrical body of the hydrocyclone (402); in a preferred embodiment, to adjust the size of the separation of the solid particles, the vortex acceleration is regulated and the geometry and/or nozzles of the hydrocyclone are modified; subsequently the mixture passes to a static mixer (403) whose function is to promote a mixture of fluid materials where this mixture is given by inserting a coagulating agent (404), preferably aluminum hydroxychloride. (PAC), a pH stabilizing agent (405) (acid or alkaline), and an oxidizing agent (406), preferably Sodium Hypochlorite, to oxidize any remaining organic load, to later be transferred to a reaction or flocculation chamber (407), where you have a stay of 300 seconds.

Preferably, the coagulation-flocculation module (400) is in communication with an absorption and/or filtration module, where the water is conducted to an array of filters if additional purification of the suspended solids is desired; said filters contain inside filtering material alone or in combination, with at least one sand filter (408) and at least one carbon filter (409) being preferably arranged, where the fluid is finally channeled into an outlet means (410) that deposits the mixture in a treated water module. The coagulation-flocculation module (400) uses a three-phase electrical generator of 127 to 220 V, 12000 W that provides the supply of electrical energy for the required processes, energizing a control panel from where it is operated or manipulated the stop and start of the components used depending on the case, also due to their thermo-magnetic switches, serve as a protection measure in case of an electrical overload; A vertical submersible feed pump 1 HP, three-phase, is used, which supplies the water to a storage tank, passing through flow regulating valves, filters filled with the filtering material of silica sand, and zeolite, capturing the water in a storage tank to supply to the ultrafiltration system, eliminating practically all the dissolved and suspended solids in the water, as a process of refining the treated water, obtaining a final product with optimum quality, complying with the established and required regulations, to finally send it to the storage tank for your final disposal.

In a further aspect, the line feeding the coagulation reactor has various inlets to deliver various products to promote coagulation or modify the ph. Optionally, prior to entering the coagulation reactor, there is a hydrocyclone specially positioned to reduce the load of suspended solids.

Ideally, at least one filter array is positioned in communication with the coagulation reactor to provide a treatment to remove solids from the treated water.

The treated water in the storage tanks from the coagulation reactor is used to maintain the filters of the electrolysis module by backwashing or is sent to the evaporator to remove the salts.

The treated water module (500) has at least one storage tank, where it is filled with coagulated or coagulation water, said tank has a capacity of 22000 cubic meters where it has an inlet line (501) that feeds the tank (502), where in turn it has a plurality of outlet means, where first, backwash lines (503) can be mentioned for cleaning the different filters of the system, where they have of a pumping means (504) in each of its lines that in turn is connected to the filters to carry out eventual backwashes in these, promoting a configuration that serves to maintain the arrangement. They also have a series of outlet means to an evaporator (505), where it feeds the evaporator-condenser module (600), which in turn has at least one evaporator (601) which in turn is connected to a boiler (602) that makes a temperature increase of 150° C. where the water that could still contain salts that passes through the evaporators (601) has u An evaporation whose destination is found in a plurality of condensers that are fed by a series of suction pumps that deposits the gas mixture in the condenser and in this way distilled water is obtained.

In the sludge treatment module (700) there is a sludge container (701) that receives the concentrated sludge from the processes that have been running where this sludge container in turn is provided with a plurality of inlet valves (702) arranged at one of its ends and feeding the mixture to this sludge container where there are a plurality of plates (703), preferably made of stainless steel as anode and cathode inside the sludge rector that promote an electrolysis process, in an operating range of 0-60 volts and 0-1250 Amps of direct or direct current and that are applied constantly during the electrolysis cycle in the sludge reactor that has the water to be treated where they have a period of time of 7 minutes and treating 24 I/sec. In the lower part of the primary reactor, there is a plurality of means of egress (206), where in each of these modules a hydraulic pump with a power of 2HP is connected that returns the mixture to the electrolysis module by means of a sludge-electrolysis connector (704). Where in this module there is also a drying bed (704) where the remaining sludge that was the result of all the preceding processes is deposited, where a large part of the water has been removed, so that in the drying is available inactive sludge.

The sludge generated in the different processes is extracted and sent to the sludge reactor to provide treatment with electrolysis and subsequently the sludge is sent to a drying bed for final disposal as deactivated sludge.

The sludge generated in the absorption module is extracted and sent to the sludge reactor to provide treatment with electrolysis and subsequently the sludge is sent to a drying bed for final disposal as deactivated sludge. The sludge reactor for wastewater treatment is designed to perform a treatment of sludge from the treatment of congenital water or deformation water, integrated by a containment unit where the sludge from a fluid used in the extraction of hydrocarbons is housed, in where it is connected to a main compressor and also has an intermediate connection that connects it to a reaction tank, where the reaction tank is first arranged in the upper middle part of the trailer-type structure and preferably has a casing. in a globally prismatic quadrangular shape, where at one of its ends it has an inlet connection that is coupled to the intermediate connection and thus give way for the mixture to enter the interior of the reaction tank, this inlet connection has a preferably circular cross section and presents two bends in its axial axis that allow it to direct the me Move to the bottom of the reaction tank to ensure correct distribution. In a preferred aspect, a sludge reactor is fluidly connected to the reactors and filters for sludge treatment. Still a further aspect, the system of the present invention may comprise a line to administer a known electrolyte solution to make the demineralized water leaving the evaporator drinkable.

Once the electromagnetic process is finished, in which a greater quantity of hydrocarbons that has been separated from the emulsion is eliminated, said oil is removed from the water, from the upper part of the container helped by the difference in densities that exists in the emulsion.

Active sludge from oil activity is deactivated, eliminating 98%. The rest of the sludge is processed separately, by means of another similar electrolytic reactor, but with a more intense voltage, sending the waste to a bed of sludge drying, resulting in a highly nitrogenous sulfate, considered a fertilizer. That is to say, the Invention does not generate toxic sludge, it deactivates them and generates a small portion of nitrogenous sulfate.

In a preferential modality, if you want to make the water drinkable for human consumption, you can have a mineralization module (800) that has a series of containers with minerals such as calcium, magnesium, sodium, iron, chloride, fluoride that are supplied in the water mixture obtained in order to obtain mineralized water that is deposited in a final container, to be made available to the end user.

Preferentially, the hydrocarbon wastewater treatment plant comprises an automation system, mainly composed of Software designed based on the Algorithms that generate the equations. quantum processes described above. Each phase of the system has a built-in PLC for the control of protection components, thermomagnetic switches, fuses, force components, variable speed drive for hydraulic pumps, contactors for motors, relays for handling solenoid valves, start-up of the control equipment.

The system of the present invention can also be comprised of an arrangement of inputs and outputs in each reactor or module that is controlled by a master control to control the flow in each area of the system.

The master control (900) is in charge of controlling each of the system modules, it also allows a user to monitor the operation of the system either at the monitoring station or remotely or remotely, since the master control has with a central communication device, and through said device monitoring and system configuration can be carried out, such as operating parameters remotely or in person, since it has a screen (902) that can be Touch or any other means to display the information, as well as a data input/output interface (901) for configuration by the user or technician. The master control can be any data processing device, preferably a PLC.

The master control (900) communicates by means of a data bus (903) to each of the phases of the system to its respective component control (PLC) in such a way and as an example for phase 1 it is connected to the control 1 (904) for the case of the electrolysis phase, and thus have the readings and control of the parameter measurement sensors (915), of which it will be monitored by means of the sensors that correspond to each of the parameters to be measured (for example: temperature, PH, electrical conductivity, dissolved oxygen, chlorine, flow rate, ORP, turbidity, peracetic acid, hydrogen peroxide, bromine, ozone, etc.), in order to carry out the control of the phase in which it is located, in the case of the electrolysis phase, communication is carried out with the electrode control module for the electrolysis reactor (914), likewise, the thermomagnetic are controlled, to protect the system from major failures when something is missing operating correctly, which is carried out by means of the block (912), and this in turn verifies and controls the set of fuses (913) that the system contains.

Additionally, the control module 1 (904) controls the activation of the supply and outlet valves, which is carried out by the solenoid valve control module (910), for which this module controls the activation of the corresponding relays through the module of relays (911), at the same time and depending on the moment of operation, are the hydraulic pumps, this by means of the pump control (907), this module is in charge of activating the correct pumps for the operation of the system, in addition to is in charge of controlling the speed by means of the speed variator module (908) as well as the motor contactors for starting and stopping that is carried out by the pump contactor module (909), finally this control also has a input/output interface (906) and an information display device (905).

Each one of the phases of the system has a control system dedicated to said phase, in such a way that in phase two of the system, there is a control 2 (916) in communication with the master control (900) through the data bus (903), this control system contains the same elements that were described in control 1 (904), and works by activating the elements that this phase contains, and thus for each of the phases of the system, so if There are five phases that contain elements to control, then there are five control modules, which are represented as (917) all in communication with the master control (900) through the data bus (903), and in this way it is carried carry out the configuration of each control module, to function according to the phase in which the process is located.

Although a preferred embodiment is shown and specified in detail in the drawings and in the foregoing specification, these should be viewed as purely exemplary and not as limiting of the invention. It is noted in this regard that only the preferred exemplary embodiment is shown and specified, and all variations and modifications should be protected from being presently or in the future within the scope of protection of the invention as defined in the claims.

LIST OF REFERENCES system for industrial and hydrocarbon wastewater treatment (1)
skimmer module (100)
feed line (101)
hydraulic pump (102)
primary feeder (103)
skimming container (104)
skimmer (105)
skimming motor (106)
skimming band (107)
fine bubble diffusers (108)
air compressor (109)
outlet tray (110)
external container (111)
external container outlet (112)
outlet pump (113)
general oil container (114)
oil container (115)
secondary feeder (116)
second skimming container (117)
skimmer (118)
skimming motor (119)
skimming belt (120)
fine bubble diffusers (121)
air compressor (122)
external container (123)
outer container outlet (124)
outlet pump (125)
feeder (126)
side connectors (127)
central pumping medium (128)
parameter measurement module (129)
electrolysis feeder (130)
electrolysis module (200)
electrolysis module (201)
reaction chamber (202)
inlet valves (203)
plurality of plates (204)
support bar (205)
means of egress (206)
hydraulic pump (207)
primary collector (208)
parameter measurement module (209)
secondary reactor (211)
reaction chamber (212)
inlet valve (213)
plates (214)
support bar (215)
outlet means (216)
hydraulic pump (217)
filter inlet (218)
sand filters (219)
carbon filters (220)
outlet manifold (221)
third electrolysis module (222)
an inlet valve (224)
plates (225)
support bar (226)
outlet means (227)
hydraulic pump (228)
filter inlet (229)
sand filters (230)
carbon filters (231)
transfer tank module (300)
feeding means (301)
storage tank (302)
output arrangement (303),
connecting means (304) and
pumping medium (305)
restriction means of passage (306)
transfer outlet (307)
coagulation module—flocculation (400)
general feeder (401)
hydrocyclone (402)
static mixer (403)
coagulating agent (404)
PH stabilizing agent (405)
oxidizing agent (406)
reaction or flocculation chamber (407)
sand filters (408)
carbon filters (409)
outlet means (410)
treated water module (500)
inlet line (501)
tanks (502)
backwash lines (503)
pumping means (504)
evaporator (505)
evaporator-condenser module (600)
evaporators (601)
boiler (602)
sludge treatment module (700)
sludge container (701)
inlet valves (702)
plates (703)
drying bed (704)
mineralization module (800)
master control (900)
master control I/O interface (901)
screen (902)
data bus (903)
control 1 (904)
Information Display Device (905)
control I/O interface 1 (906)
pump control module (909)
variable speed drive module (908)
pump contactor module (909)
solenoid valve control module (910)
relay module (911)
means of the block (912)
fuse module (913)
Electrode Control Module for Electrolysis Reactor (914)
readings and control of the parameter measurement sensors (915)

The invention claimed is:

1. A system for industrial and hydrocarbon wastewater treatment (1), comprising:
at least one skimming module that receives an effluent of contaminated water to be treated, each skimmer module (100) including a skimming container (104) having a lower surface with a plurality of fine bubble diffusers (108) covering most of the lower surface of the skimming container (104), so that the bubbles inside drag a layer of a contaminated water to the surface, the same being removed by at least one skimmer (118) located on inner walls of the skimming container (104);
at least one electrolysis module (200) located at an outlet of the skimming module, each one of the electrolysis module (200) having at least one reaction chamber (202) which inside houses a plurality of plates (204), wherein the plates are held at each of their ends by a support bar (205) that project along a length of the container to allow a movement of each plate, wherein the plates (204) have an operating range of 0-60 volts and 0-1250 amps of direct or direct current that are applied constantly during an electrolysis cycle of the contaminated water to be treated;

at least one coagulation-flocculation module (400) arranged after the electrolysis module (200), each of the coagulation-flocculation module (400) comprising at least one reaction or flocculation chamber (407) closed in a cylindrical shape to remove solids;

at least one hydrocyclone arranged inside the coagulation-flocculation module; and at least one static mixer (403) arranged at an outlet of the hydrocyclone.

2. The system for industrial and hydrocarbon wastewater treatment (1) according to claim 1, wherein the skimming container (104) is connected to a general oil container (114) that accumulates fats or extracted oil.

3. The system for industrial and hydrocarbon wastewater treatment (1) according to claim 1, wherein the skimming container (104) has an arrangement of outlets (112) to control the filling capacity and at least a second skimmer (105) located at the inner walls.

4. The system for industrial and hydrocarbon wastewater treatment (1) according to claim 1, wherein the electrolysis module (200) at the lower surface includes a plurality of egress devices (206) to control the capacity of fluid to the interior.

5. The system for industrial and hydrocarbon wastewater treatment (1) according to claim 1, wherein the electrolysis module (200) is connected to an array of filter inlets (218) to refine the water to be treated.

6. The system for industrial and hydrocarbon wastewater treatment (1) according to claim 1, further including a cover on an upper part of the electrolysis module (200), the cover having a shape of a bell for capturing hydrogen and oxygen.

7. The system for industrial and hydrocarbon wastewater treatment (1) according to claim 1, wherein each one of the hydrocyclone separates solid-liquid suspensions, where coarsest particles rotate close to the wall of the hydrocyclone and, due to the effect of centrifugal acceleration, are evacuated through a nozzle.

8. The system for industrial and hydrocarbon wastewater treatment (1) according to claim 1, wherein each one of the static mixer (403) promotes a mixture of fluid materials by injecting coagulating agents (404), pH stabilizing agents (405), and/or oxidizing agents.

9. The system for industrial and hydrocarbon wastewater treatment (1) according to claim 1, wherein the coagulation-flocculation module (400) is connected to an array of filter inlets (218).

10. The system for industrial and hydrocarbon wastewater treatment (1) according to claim 1, further comprising a module of transfer tanks (300) to store a treated water, where each one of the transfer tanks has a pumping device (305) and a restriction of passage device (306) that assist in the extraction of the treated water.

11. The system for industrial and hydrocarbon wastewater treatment (1) according to claim 1, further comprising a treated water module (500) that has at least one storage tank arranged after the coagulation-flocculation module.

12. The system for industrial and hydrocarbon wastewater treatment (1) according to claim 1, further comprising an evaporator-condenser module (600) that has at least one evaporator (601) that is connected to a boiler (602) that increases the temperature 150° C., wherein water containing salts that passes through the evaporators (601) is entered into a plurality of condensers that are fed by a series of suction pumps to obtain distilled water.

13. The system for industrial and hydrocarbon wastewater treatment (1) according to claim 1, further comprising at least one sludge reactor module (700) including a sludge container (701) that receives a concentrated sludge, which has a drying bed (704) where the concentrated sludge is deposited, where a large part of the water has been removed.

14. The system for industrial and hydrocarbon wastewater treatment (1) according to claim 1, further comprising a mineralization module (800) located at an end of the system, the mineralization module (800) including a series of containers with minerals selected from the group consisting of calcium, magnesium, sodium, iron, chloride, and fluoride that are supplied in a water mixture obtained in order to obtain mineralized water.

15. The system for industrial and hydrocarbon wastewater treatment (1) according to claim 1, further including fluid lines with solenoid valves controlled by a master control to control a hydraulic residence time.

\* \* \* \* \*